(12) United States Patent
Lee et al.

(10) Patent No.: US 7,751,012 B2
(45) Date of Patent: Jul. 6, 2010

(54) ARRAY SUBSTRATE FOR IN-PLANE SWITCHING MODE LIQUID CRYSTAL DISPLAY DEVICE AND METHOD OF FABRICATING THE SAME

(75) Inventors: Do-Young Lee, Seoul (KR); Byoung-Ho Lim, Gyeongbuk (KR); Hyun-Kyu Lee, Seoul (KR); Do-Sung Kim, Gyeongsangbuk-do (KR); Byung-Koo Kang, Gyeongbuk (KR); Eui-Tae Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 745 days.

(21) Appl. No.: 11/642,590

(22) Filed: Dec. 21, 2006

(65) Prior Publication Data

US 2007/0153201 A1 Jul. 5, 2007

(30) Foreign Application Priority Data

Dec. 29, 2005 (KR) .................... 10-2005-0133555

(51) Int. Cl.
*G02F 1/1343* (2006.01)

(52) U.S. Cl. ...................................... 349/141; 349/142

(58) Field of Classification Search .......... 349/141–142
See application file for complete search history.

(56) References Cited

U.S. PATENT DOCUMENTS

2006/0001815 A1* 1/2006 Kim et al. .................... 349/141

* cited by examiner

*Primary Examiner*—Jerry T Rahll
(74) *Attorney, Agent, or Firm*—Morgan Lewis & Bockius LLP (57) ABSTRACT

An array substrate for an IPS mode LCD device includes a gate line in a first direction on a substrate and a data line in a second direction over the substrate; a metal and a common lines in the second direction on the substrate and includes a plurality of first and second protruding portions in the first direction, respectively; a TFT connected to the gate and data lines; an insulating layer over the metal and common lines; a common electrode over the insulating layer and including a first common portion in the second direction and a plurality of second common portions in the first direction; and a pixel electrode over the insulating layer and including a first pixel portion in the second direction and a plurality of second pixel portions in the first direction, wherein the plurality of second common and pixel portions are alternately arranged.

18 Claims, 11 Drawing Sheets

ARRAY SUBSTRATE FOR IN-PLANE SWITCHING MODE LIQUID CRYSTAL DISPLAY DEVICE AND METHOD OF FABRICATING THE SAME

The present application claims the benefit of Korean Patent Application No. 2005-0133555 filed in Korea on Dec. 29, 2005, which is hereby incorporated by reference.

BACKGROUND OF THE INVENTION

1. Field of the Invention

The present invention relates to a liquid crystal display (LCD) device, and more particularly, to an array substrate for an In-Plane Switching (IPS) mode LCD device that has an increased luminance and method of fabricating such IPS mode LCD device.

2. Discussion of the Related Art

The liquid crystal molecules for the LCD device have unique characteristics, such that an arrangement direction (i.e., orientation) of the liquid crystal molecules can be controlled by applying a desired level of an electrical field to them. As a result, the liquid crystal molecules become aligned to transmit light, and images can be displayed on the screen. Thus, the LCD device displays images by controlling magnitudes of the electric field applied to the liquid crystal molecules. In addition, the LCD device is sometimes referred to as an active matrix LCD (AM-LCD) device that includes an improved resolution and improved displaying features (i.e., faster response time while displaying the moving images).

Generally, most LCD devices include a thin film transistor (TFT) as a switching element. Further, a related art LCD device includes a first substrate and a second substrate that are facing each other and a liquid crystal layer interposed between the two substrates. The first substrate includes a pixel electrode, and the second substrate includes a color filter layer and a common electrode. The related art LCD device displays images by generating a vertical electric field between the pixel and common electrodes. The related art LCD device using the vertical electric field has an increased light transmittance and an increased aperture ratio. However, the related art LCD device has several problems, such as a narrow viewing angle, low contrast ratio, and other problems. To resolve the above-mentioned problems, an in-plane switching (IPS) mode LCD device having a wide viewing angle is suggested.

Figure 1:
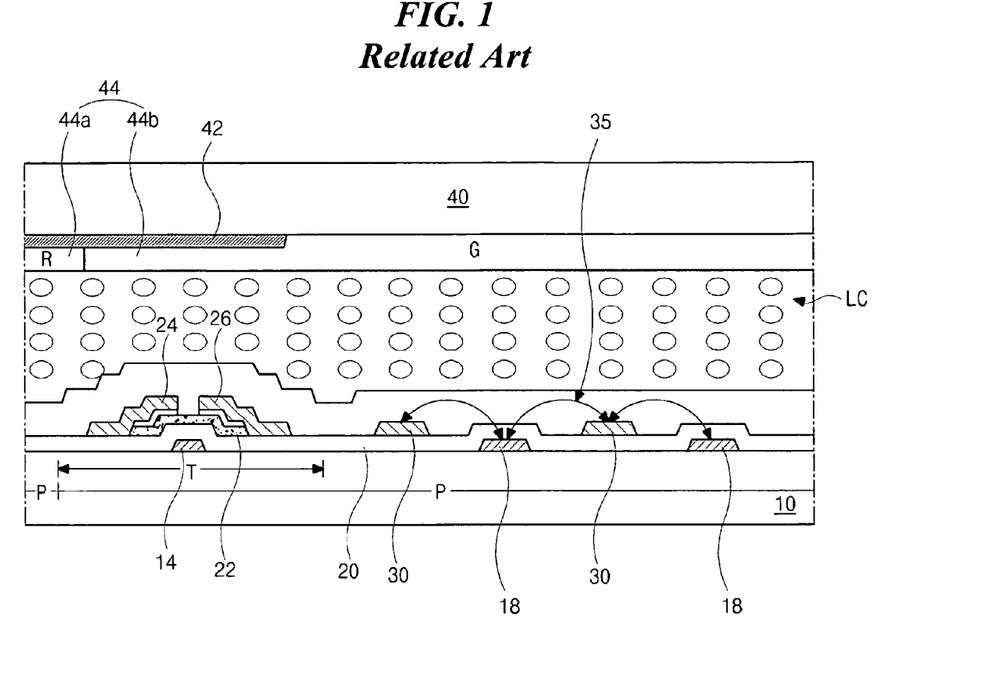
FIG. 1 is a cross-sectional view of a related art IPS mode LCD device.

FIG. 1 is a cross-sectional view of a related art IPS mode LCD device. As shown in FIG. 1, the related art IPS mode LCD device includes first and second substrates 10 and 40 that are facing each other, and a liquid crystal layer LC interposed between the two substrates. The first and second substrates 10 and 40 may be referred to as an array substrate and a color filter substrate, respectively.

A pixel region P is defined on the first substrate 10. A thin film transistor (TFT) T, a common electrode 18 and a pixel electrode 30 are formed on the first substrate 10 in the pixel region P. The TFT T includes a gate electrode 14 on the first substrate 10, a gate insulating layer 20 over the gate electrode 14, a semiconductor layer 22 over the gate insulating layer 20, and source and drain electrodes 24 and 26 over the semiconductor layer 22. The source and drain electrodes 24 and 26 are separated from each other. The common electrodes 18 and the pixel electrodes 30 are arranged alternating each other and also arranged parallel to each other. The common electrode 18 is formed of a same layer and a same material as the gate electrode 14. The pixel electrode 30 is formed of a same layer and a same material as the source and drain electrodes 24 and 26. The pixel electrode 30 is connected to the TFT T. The liquid crystal layer LC is controlled by a horizontal electric field generated between the common electrode 18 and the pixel electrode 30.

Although not shown in FIG. 1, gate and data lines are formed on the first substrate 10 to define the pixel region P, and a common line is formed on the first substrate 10 to apply voltage to the common electrode 18. The second substrate 40 includes a black matrix 42 and a color filter 44. The black matrix 42 corresponds to the gate line (not shown), the data line (not shown) and the TFT T. The color filter 44 includes sub-color filters 44a and 44b and corresponds to the pixel region P. Each of the sub-color filters 44a and 44b includes one of red R, green G and blue B (not shown) color.

Figure 2:
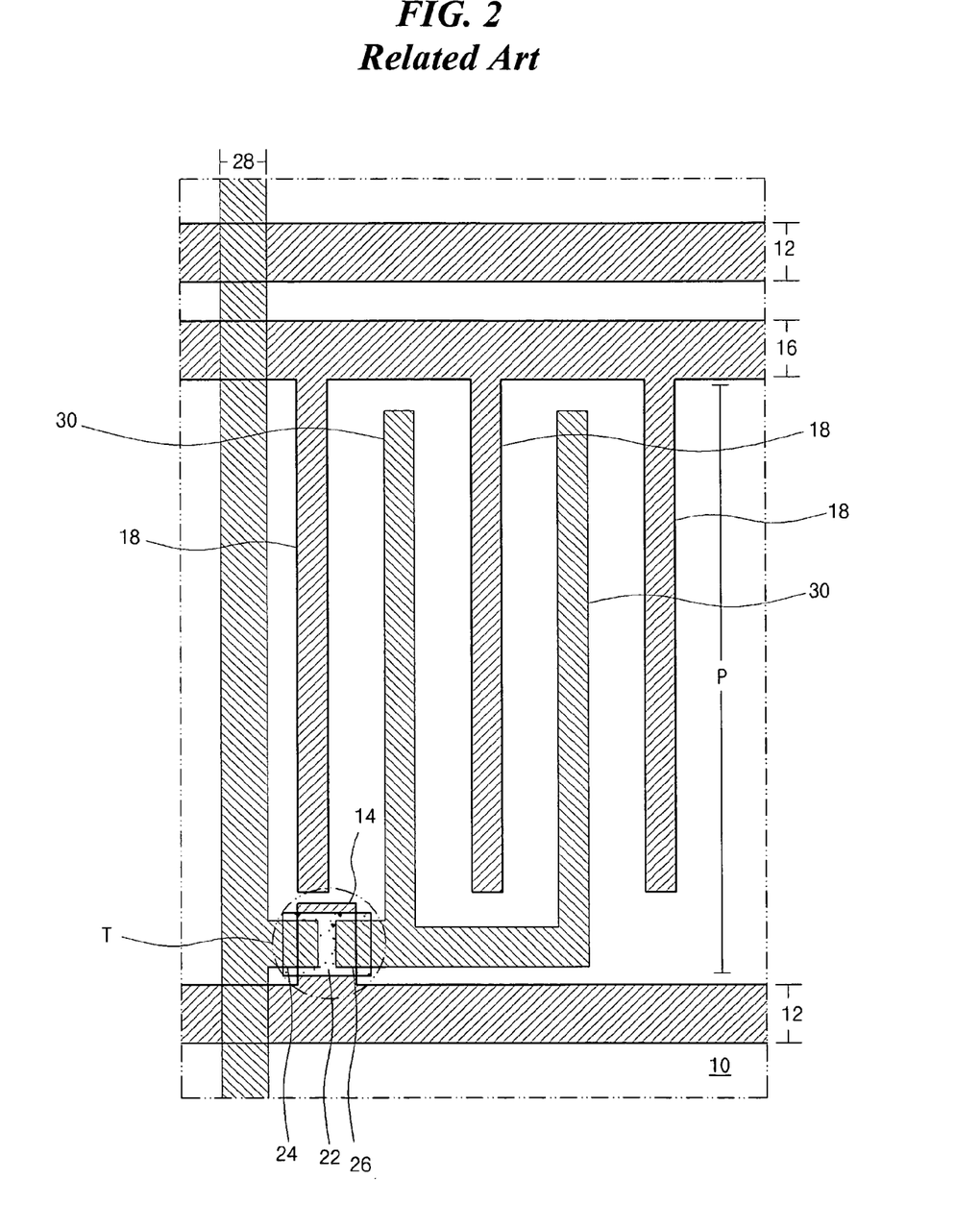
FIG. 2 is a plane view of an array substrate for the related art IPS mode LCD device of FIG. 1.

FIG. 2 is a plane view of an array substrate for the related art IPS mode LCD device. As shown in FIG. 2, the gate line 12 and data line 28 are formed on the first substrate 10 to define the pixel region P, and a common line 16 is formed parallel to the gate line 12. The TFT T is formed in the pixel region P and connected to the gate and data lines 12 and 28. The TFT T includes the gate electrode 14, the gate insulating layer 20 (of FIG. 1), the semiconductor layer 22 and the source and drain electrodes 24 and 26. The source and drain electrodes 24 and 26 are separated from each other. The gate electrode 14 extends from the gate line 12 and the source electrode 24 extends from the data line 28. Moreover, the common electrode 18 and the pixel electrode 30 are formed in a comb shape in the pixel region P. The pixel electrode 30 is connected to the TFT T and the combs of the pixel electrode 30 are arranged alternately with the combs of the common electrode 18. The common electrode 18 extends from the common line 16 such that the common electrode 18 is perpendicular to the common line 16. The common and pixel electrodes 18 and 30 are parallel to each other.

The related art IPS mode LCD device including the array substrate of FIG. 2 has an improved viewing angle in the left and right sides. However, the viewing angle in the upper and lower sides, and along the diagonal direction are not improved. To resolve the above problem, another related art IPS mode LCD device (shown in FIG. 3) is suggested. The common and pixel electrodes are aligned in a length-wise direction and a width-wise direction to increase the viewing angle in the upper and lower sides.

Figure 3:
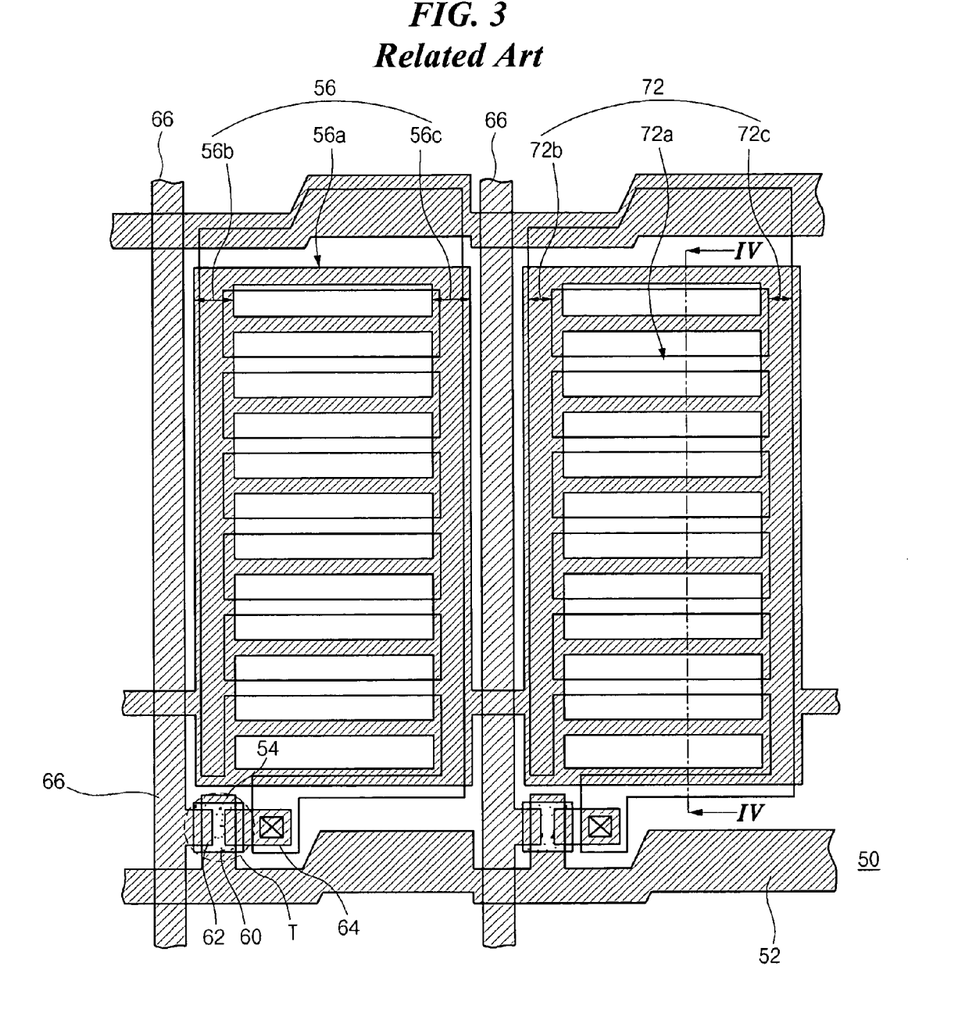
FIG. 3 is a plane view of an array substrate for another related art IPS mode LCD device.

FIG. 3 is a plane view of an array substrate for another related art IPS mode LCD device. As shown in FIG. 3, the gate lines 52 and data lines 66 are formed on the substrate 50 to define the pixel region P. The TFT T is formed in the pixel region P and connected to the gate and data lines 52 and 66. The TFT T includes the gate electrode 54, the gate insulating layer (not shown), the semiconductor layer 60 and the source and drain electrodes 62 and 64. The source and drain electrodes 62 and 64 are separated from each other. The gate electrode 54 extends from the gate line 52 and the source electrode 62 extends from the data line 66. Further, the common and pixel electrodes 56 and 72 are formed in the pixel region P. The pixel electrode 72 is connected to the TFT T.

The common electrode 56 is formed of a same layer and a same material as the gate electrode 54. The pixel electrode 72 is formed of a transparent conductive material to increase an aperture ratio. However, the pixel electrode 72 may be formed of a same layer and a same material as the source and drain electrodes 62 and 64. The gate insulating layer (not shown) and a passivation layer (not shown) are disposed between the common electrode 56 and the pixel electrode 72 to prevent the two electrodes from contacting each other.

The common electrode 56 includes a plurality of first common portions 56a, second common portions 56b, and third common portions 56c. As shown in FIG. 3, the plurality of first common portions 56a are disposed in a width-wise direction, and the second and third common portions 56b and 56c are disposed in a length-wise direction. In other words, the plurality of first common portions 56a are disposed parallel to the gate line 52, and the second and third common portions 56b and 56c are disposed parallel to the data line 66. Similarly, the pixel electrode 72 includes a plurality of first pixel portions 72a, second pixel portions 72b, and third pixel portions 72c. The plurality of first pixel portions 72a are disposed in the width-wise direction, and the second and third pixel portions 72b and 72c are disposed in the length-wise direction. The plurality of first pixel portions 72a are parallel to the plurality of first common portion 56a, and the second and third pixel portions 72b and 72c are parallel to the first and second common portions 56b and 56c.

Since the common and pixel electrodes 56 and 72 are disposed in the width-wise and length-wise directions, the viewing angle in the upper and lower sides is improved. Moreover, when the plurality of first common and pixel portions 56a and 72a are parallel to the gate and data lines 52 and 66, the viewing angle along the diagonal direction is improved.

Figure 4:
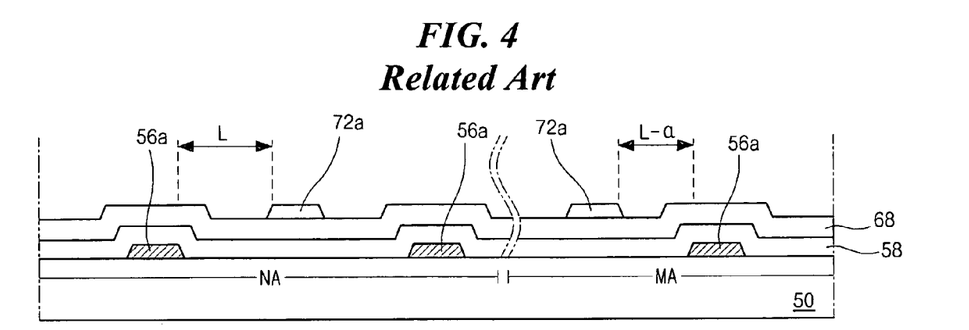
FIG. 4 is a cross-sectional view taken along line IV-IV of FIG. 3.

However, since the common and pixel electrodes 56 and 72 are formed of different layers, a misalignment of layers may result. FIG. 4 is a cross-sectional view taken along line IV-IV of FIG. 3. As shown in FIG. 4, the plurality of first common portions 56a are formed on the substrate 50. The gate insulating layer 58 is formed over the plurality of common portions 56a and the passivation layer 68 is formed over the gate insulating layer 58. The plurality of first pixel portions 72a are formed on the passivation layer 68 and are alternately arranged with the plurality of first common portions 56a. Accordingly, since the plurality of first common portions 56a are formed on the substrate 50 before the plurality of first pixel portions 72a are formed, misalignment is generated during formation of the plurality of first common and first pixel portions 56a and 72a.

The plurality of first common and first pixel portions 56a and 72a are formed by a mask process (not shown) and the misalignment is generated during the mask process. As shown in FIG. 4, a distance between the first common and pixel portions 56a and 72a is "L" in a normal area NA. However, a distance between the first common and pixel portions 56a and 72a becomes "L-a" in a misalignment area MA. And, "L-a" is less than the "L".

The related art IPS mode LCD device having the above problems includes decreased image display quality. Further, the array substrate of FIG. 3 includes the common electrode 56 formed of a same opaque material as the gate electrode 54, thus decreasing the luminance.

SUMMARY OF THE INVENTION

Accordingly, the present invention is directed to an array substrate for an IPS mode LCD device and method of fabricating the same that substantially obviates one or more of the problems due to limitations and disadvantages of the related art.

An object of the present invention is to provide an IPS mode LCD device that improves a viewing angle and an aperture ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an In-Plane Switch (IPS) mode liquid crystal display (LCD) device includes a gate line in a first direction on a substrate and a data line in a second direction over the substrate; a metal line in the second direction on the substrate and including a plurality of first protruding portions in the first direction; a common line in the second direction on the substrate and including a plurality of second protruding portions in the first direction; a thin film transistor (TFT) connected to the gate and data lines; an insulating layer over the metal line and the common line; a common electrode over the insulating layer and including a first common portion in the second direction and a plurality of second common portions in the first direction; and a pixel electrode over the insulating layer and including a first pixel portion in the second direction and a plurality of second pixel portions in the first direction, wherein the plurality of second common portions are alternately arranged with the plurality of second pixel portions.

In another aspect, a method of fabricating an array substrate for an In-Plane Switch (IPS) mode liquid crystal display (LCD) device includes forming a gate line, a gate electrode, a metal line, and a common line on a substrate, wherein the gate line is formed in a first direction, the gate electrode extends from the gate line in a second direction, and the metal and common lines are formed in the second direction, the second direction perpendicular to the first direction, the metal line separated from the common line, and the metal line includes a plurality of first protruding portions and the common line includes a plurality of second protruding portions; forming an gate insulating layer over the gate line, the gate electrode, the metal line and the common line; forming a semiconductor layer over the gate insulating layer at a portion corresponding to the gate electrode; forming source and drain electrodes and a data line over the semiconductor layer, wherein the data line is formed in the second direction, the source electrode extends from the data line, and the source electrode is separated from the drain electrode; forming a passivation layer over the source and drain electrodes and the data line, and first to third contact holes defined through the passivation layer, wherein the first contact hole exposes the metal line, the second contact holes expose the common line, and the third contact hole exposes the drain electrode; and forming a common electrode and a pixel electrode over the passivation layer, the common electrode includes a first common portion in the second direction and a plurality of second common portions extending from the first common portion, and the pixel electrode includes a first pixel portion in the second direction and a plurality of second pixel portions extending from the first pixel portion, wherein the plurality of second common portions are alternately arranged with the plurality of second pixel portions.

In another aspect, an array substrate for an In-Plane Switch (IPS) mode liquid crystal display (LCD) device includes a substrate; a gate line in a first direction on the substrate; a data line in a second direction over the substrate; a common line in the second direction on the substrate; a thin film transistor (TFT) connected to the gate and data lines; an insulating layer on the common line; a common electrode over the insulating layer and including a first common portion in the second direction and a plurality of second common portions in the first direction, and the plurality of second common portions extend from the first common portion; and a pixel electrode over the insulating layer and including a first pixel portion in the second direction and a plurality of second pixel portions in the first direction, and the plurality of second pixel portions extend from the first pixel portion, wherein the first pixel portion is separated from the first common portion, and the plurality of second pixel portions are alternately arranged with the plurality of second common portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 5:
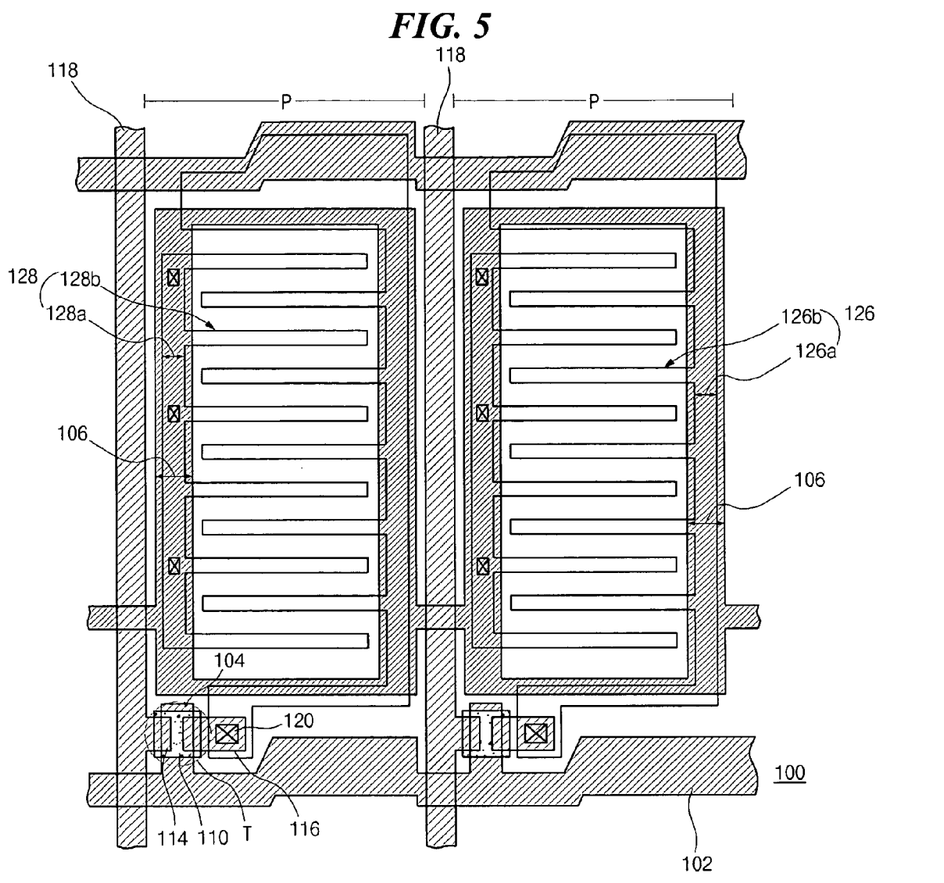
FIG. 5 is a plane view of an array substrate for an exemplary IPS-mode LCD device according to a first exemplary embodiment of the present invention.

FIG. 5 is a plane view of an array substrate for an exemplary IPS-mode LCD device according to a first exemplary embodiment of the present invention. As shown in FIG. 5, the gate line 102, the data line 118, and the common line 106 are formed on the substrate 100 to define the pixel region P. The TFT T is formed in the pixel region P and connected to the gate and data lines 102 and 118. The TFT T includes a gate electrode 104, a gate insulating layer (not shown), a semiconductor layer 110 and a source electrode 114 and a drain electrode 116. The gate electrode 104 extends from the gate line 102 and the source electrode 114 extends from the data lines 102. The source and drain electrodes 114 and 116 are separated from each other. The common line 106 is formed of a same layer as the gate line 102. As shown in FIG. 5, common lines 106 formed adjacent to each other (i.e., one common line 106 in one pixel region P and another common line 106 in an adjacent pixel region P) may be connected with each other.

The common electrode 128 and pixel electrode 126 are formed in the pixel region P. The common electrode 128 is connected to the common line 106 through a common contact hole 108, and the pixel electrode 126 is connected to the TFT T through a drain contact hole 120.

The common electrode 128 includes a first common portion 128a and a plurality of second common portions 128b. The first common portion 128a is aligned in the length-wise direction. The plurality of second common portions 128b are aligned in the width-wise direction and formed extending from the first common portion 128a. The first common portion 128a is parallel to the data line 118, and the plurality of second common portions 128b are perpendicular to the first common portion 128a. Similarly, the pixel electrode 126 includes a first pixel portion 126a and a plurality of second pixel portions 126b. The first pixel portion 126a is aligned in the length-wise direction. The plurality of second pixel portions 126b are aligned in the width-wise direction and formed extending from the first pixel portion 126a. The first pixel portion 126a is parallel to the data line 118, and the plurality of second pixel portions 126b are perpendicular to the first pixel portion 126a. In addition, the common and pixel electrodes 128 and 126 are formed of a same layer and formed of a same transparent conductive material.

Since the common and pixel electrodes 128 and 126 are formed of a same layer, misalignment of two layers can be prevented. And, a distance between the pixel and common electrodes 128 and 126 can be maintained equal at all time. Further, since the common and pixel electrodes 128 and 126 are formed of a transparent conductive material, luminance is improved.

Figure 6:
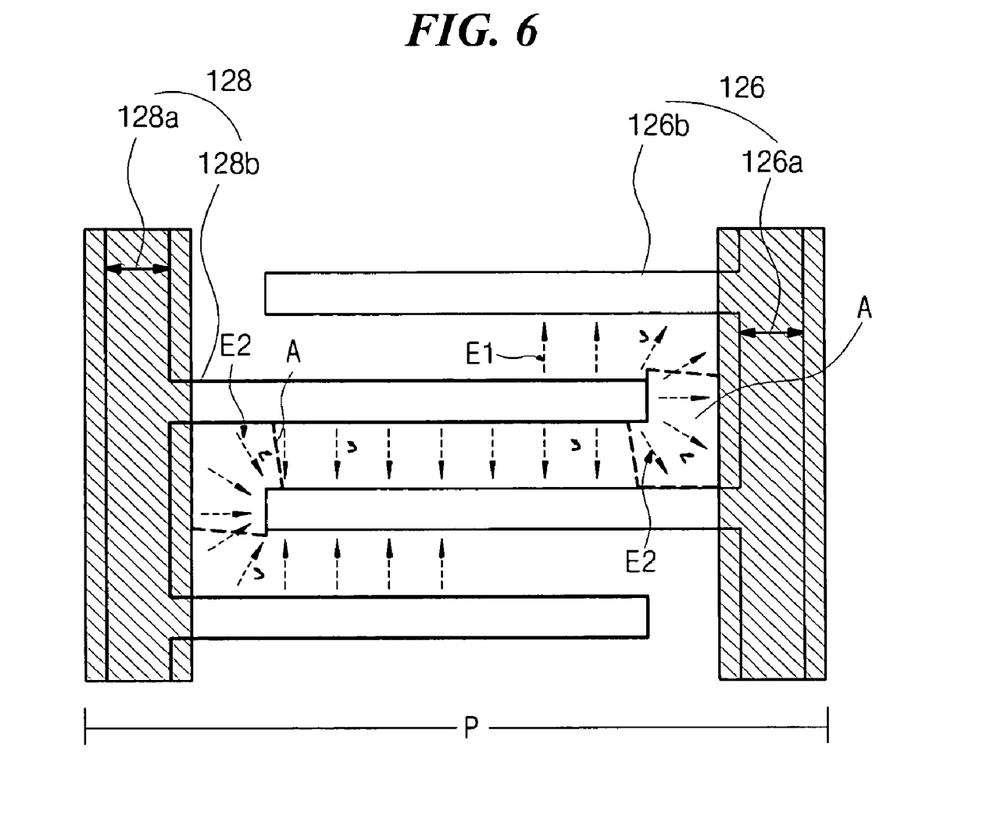
FIG. 6 is a plane view illustrating a distorted electric field phenomenon in a pixel region of an array substrate for the exemplary IPS-mode LCD device of FIG. 5.

FIG. 6 is a plane view illustrating a distorted electric field phenomenon in a pixel region of the exemplary array substrate of FIG. 5. As shown in FIG. 6, forming the common and pixel electrodes 128 and 126 with a same layer creates gaps between the first common portion 128a and each second pixel portion 126b, between the first pixel portion 126a and each second common portion 128b, and between the second common portions 128b and the second pixel portions 126b. Accordingly, the electric field is induced between the plurality of second common and pixel portions 128b and 126b, between the first common portion 128a and each second pixel portion 128b, and between the first pixel portion 126a and each second common portion 128b.

As shown in FIG. 6, the first common portion 128a and the plurality of second common portions 128b extending from the first common portion 128a are formed in the pixel region P. Similarly, the first pixel portion 126a and the plurality of second pixel portions 126b extending from the first pixel portion 126a are formed in the pixel region P. As mentioned earlier, the common and pixel electrode 128 and 126, hence portions 128a, 126a, 128b, and 126b are formed of the same layer and the same transparent conductive material.

In addition, the plurality of second common portions 128b and pixel portions 126b are arranged parallel to each other having gaps formed therebetween. Accordingly, a first electric field E1 is induced between the plurality of second common and pixel portions 128b and 126b. The plurality of second common portions 128b are separated from and perpendicular to the first pixel portion 126a. Similarly, the plurality of second pixel portions 126b are separated from and perpendicular to the first common portion 128a. Accordingly, a second electric field E2 is generated in a region A. And, the first and second electric fields E1 and E2 have different shapes. In more detail, the first electric field E1 is formed in the length-wise direction. However, the second electric field E2 is formed along the width-wise direction having a fan shape. And, the second electric field E2 deteriorates the image quality of the IPS mode LCD device. Accordingly, another exemplary array substrate for an IPS mode LCD device is proposed to solve above problem.

Figure 7:
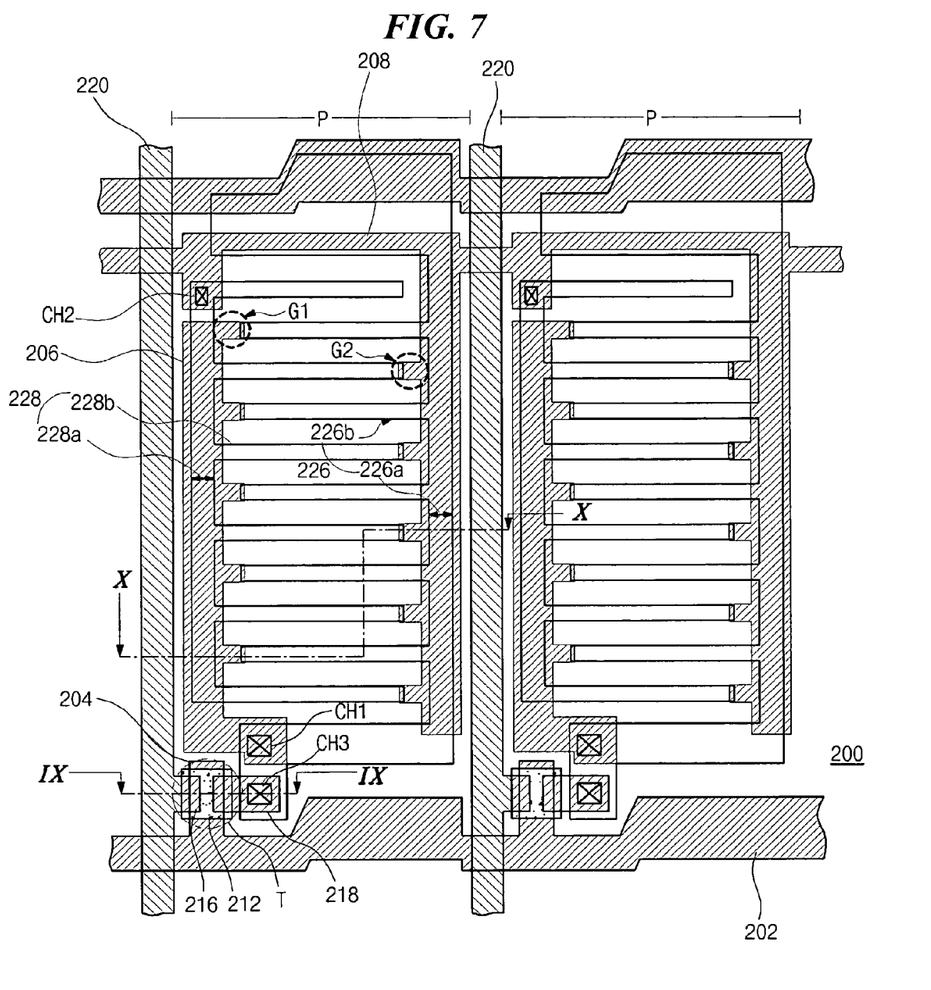
FIG. 7 is a plane view of an array substrate for an exemplary IPS-mode LCD device according to a second exemplary embodiment of the present invention.

FIG. 7 is a plane view of an array substrate for an IPS-mode LCD device according to a second exemplary embodiment of the present invention. As shown in FIG. 7, a gate line 202, a data line 220, and a common line 208 are formed on the substrate 200 to define the pixel region P. The TFT T is formed in the pixel region P and connected to the gate and data lines 202 and 220. The TFT T includes a gate electrode 204, a gate insulating layer (not shown), a semiconductor layer 212, and source and drain electrodes 216 and 218. The gate electrode extends from the gate line 202 and the source electrode 216 extends from the data line 220. The source and drain electrodes 216 and 218 are separated from each other.

Figure 10A:
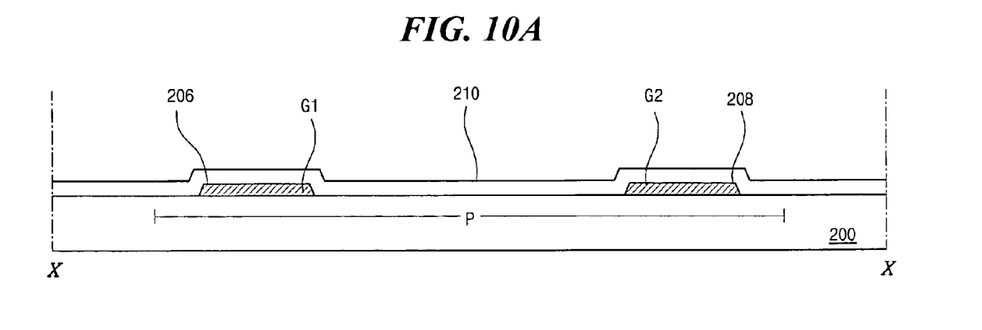
FIGS. 10A to 10D are cross-sectional views taken along line X-X of FIG. 7 showing the exemplary fabricating processes of the second exemplary embodiment of the present invention.

The common line 208 is formed of a same layer as the gate line 202. The common lines 208 formed adjacent to each other (i.e., one common line 208 in one pixel region P and another common line 208 in an adjacent pixel region P) may be integrated with each other. The common lines 208 in adjacent pixel regions P is integrated such that a same voltage is applied to them. A metal line 206 having a shape symmetrical with respect to the common line 208 is formed. The common line 208 is formed of a same layer and with a same material as the metal line 206. As shown in FIG. 10D, the common electrode 228 is formed over the metal line 206 and the pixel electrodes 226 is formed over the common line 208. The gate insulating layer 210 and the passivation layer 222 are disposed between the common electrode 228 and the metal line 206, and between the pixel electrode 226 and the common line 208.

In detail, the common electrode 228 includes the first common portion 228a and the plurality of second common portions 228b. The first common portion 228a is formed over the metal line 206 in the length-wise direction. The plurality of second common portions 228b extend from the first common portion 228a and are perpendicular to the first common portion 228a. Similarly, the pixel electrode 226 includes the first pixel portion 226a and the plurality of second pixel portions 226b. The first pixel portion 226a is formed over the common line 208 in the length-wise direction. The plurality of second pixel portions 226b extend from the first pixel portion 226a and are perpendicular to the first pixel portion 228a.

The first common portion 228a is separated from the first pixel portion 226a and they are parallel to each other. The plurality of second common portions 228b are alternatively arranged with the plurality of pixel portions 226b. The metal line 206 is connected to the pixel electrode 226 within a first contact hole CH1, the common line 208 is connected to the common electrode 228 within a second contact hole CH2, and the pixel electrode 226 is connected to the drain electrode 218 of the TFT T within a third contact hole CH3. The metal line 206 may be directly connected to the drain electrode 218 within a third contact hole CH3.

A plurality of first protruding portions G1 extend perpendicularly from the metal line 206 and are parallel to the plurality of second pixel portions 226b. Similarly, a plurality of second protruding portions G2 extend perpendicularly from the common line 208 and are parallel to the plurality of second common portions 228b. In addition, the plurality of first protruding portions G1 partially overlap the plurality of second pixel portions 226b, and the plurality of second protruding portions G2 partially overlap the plurality of second common portions 228b. Accordingly, as shown in FIG. 8, distortion of the electric field between the first common portion 228a and each second pixel portion 226b and between the first pixel portion 226a and each second common portion 228b are prevented.

Figure 8:
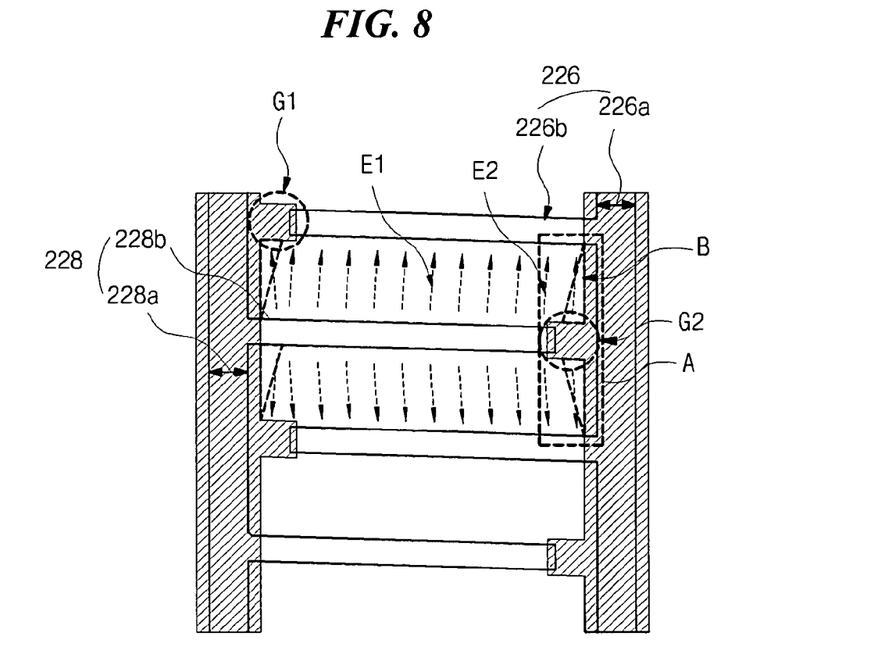
FIG. 8 is a plane view illustrating a distorted electric field phenomenon in a pixel region of an array substrate for the exemplary IPS-mode LCD device of FIG. 7.

FIG. 8 is a plane view illustrating a distorted electric field phenomenon in a pixel region of the exemplary array substrate of FIG. 7. As shown in FIG. 8, the first electric field E1 is induced between the plurality of second common and pixel portions 228b and 226b, and the second electric field E2 is generated in a rectangular region A between the first pixel portion 226a and each second common portion 228b. Similarly, the second electric filed E2 is generated between the first common portion 228a and each second pixel portion 226b. In a triangular region B, where the first and second protruding portions G1 and G2 meet the metal line 206 and common line 208, respectively, the second electric field E2 is lightly distorted. However, the first and second electric fields E1 and E2 have a substantially same shape. Accordingly, image deterioration discussed in the first exemplary embodiment is prevented.

Figure 9A:
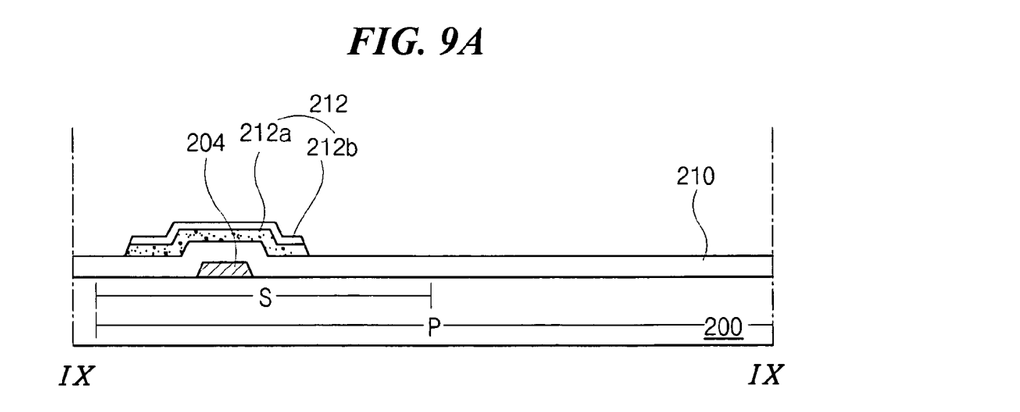
FIGS. 9A to 9D are cross-sectional views taken along line IX-IX of FIG. 7 showing exemplary fabricating processes of the second exemplary embodiment of the present invention.

FIGS. 9A to 9D are cross-sectional views taken along line IX-IX of FIG. 7 showing exemplary fabricating processes of the second exemplary embodiment of the present invention. FIGS. 10A to 10D are cross-sectional views taken along line X-X of FIG. 7 showing the exemplary fabricating processes of the second exemplary embodiment of the present invention. As shown in FIGS. 9A, the gate electrode 204 and the gate line 202 (of FIG. 7, not shown) are formed on the substrate 200 by depositing and patterning a first metal layer (not shown). The gate line 202 (of FIG. 7) extends from the gate electrode 204. At the same time, the metal line 206, the common line 208 and the plurality of first and second protruding portions G1 and G2 are formed on the substrate 200 in the pixel region P (FIG. 10A). The metal line 206 is formed at one side of the pixel region P, and the common line 208 is formed at an opposite end of the pixel region P. The plurality of first protruding portions G1 extend from the metal line 206 towards the common line 208, and the plurality of second protruding portions G2 extend from the common line 208 toward the metal line 206. A switching region S, where the TFT T is formed, is defined in the pixel region P.

Next, the gate insulating layer 210 is formed over the gate electrode 204, the metal line 206, the common line 208 and the plurality of first and second protruding portions G1 and G2 by depositing an inorganic insulating material, such as silicon oxide (SiO2) and silicon nitride (SiNx). Next, the semiconductor layer 212 including an active layer 212a and an ohmic contact layer 212b are formed on the gate insulating 210 over the gate electrode 204 by depositing and patterning an intrinsic amorphous silicon (a-Si:H) and an impurity-doped amorphous silicon (n+a-Si:H). The active layer 212a and the ohmic contact layer 212b are formed of intrinsic amorphous silicon (a-Si:H) and impurity-doped amorphous silicon (n+a-Si:H).

Figure 9B:
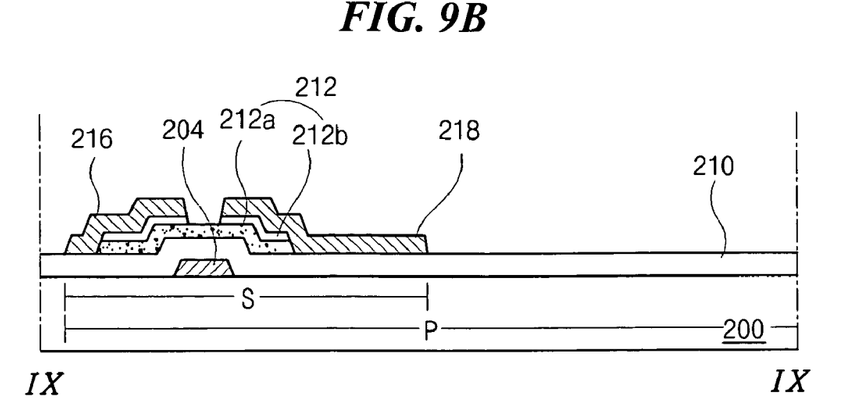
Figure 10B:
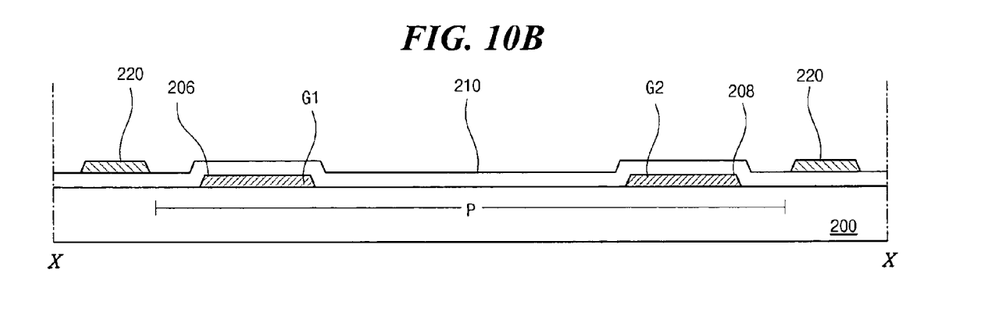

Next, as shown in FIGS. 9B and 10B, the source and drain electrodes 216 and 218 are formed on the semiconductor layer 212 and the data lines 220 are formed on the gate insulating layer 210 by depositing and patterning a second metal layer (not shown). The second metal layer (not shown) includes at least one of aluminum (Al), aluminum alloy (AlNd), chromium (Cr), tungsten (W), molybdenum (Mo), Titanium (Ti), and moly-tungsten (MoW). The source electrode 216 extends from the data line 220 and is separated from the drain electrode 218. And, the data line 220 crosses the gate line 202 (of FIG. 7) perpendicularly to define the pixel region P. While patterning the second metal layer (not shown), the ohmic contact layer 212b between the source and drain electrodes 216 and 218 is also patterned.

Figure 9C:
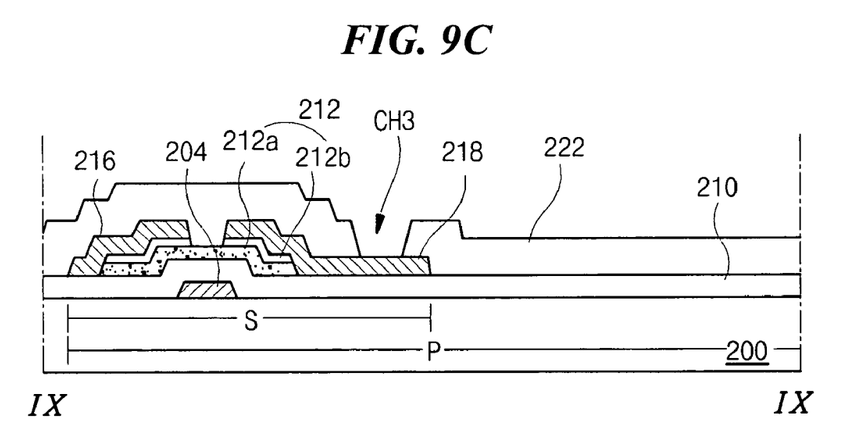
Figure 10C:
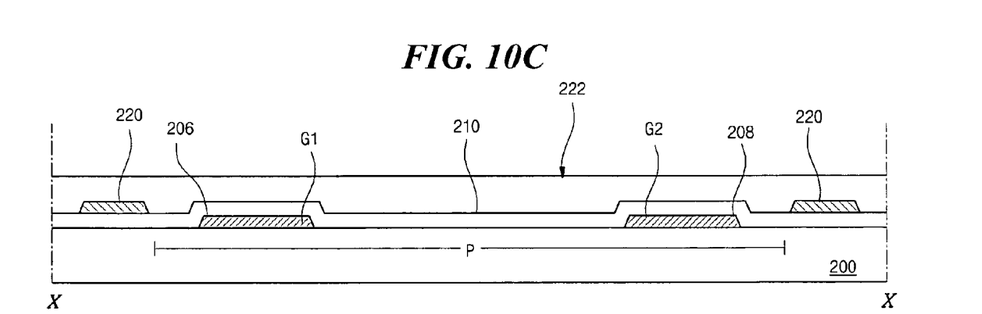
Figure 10D:
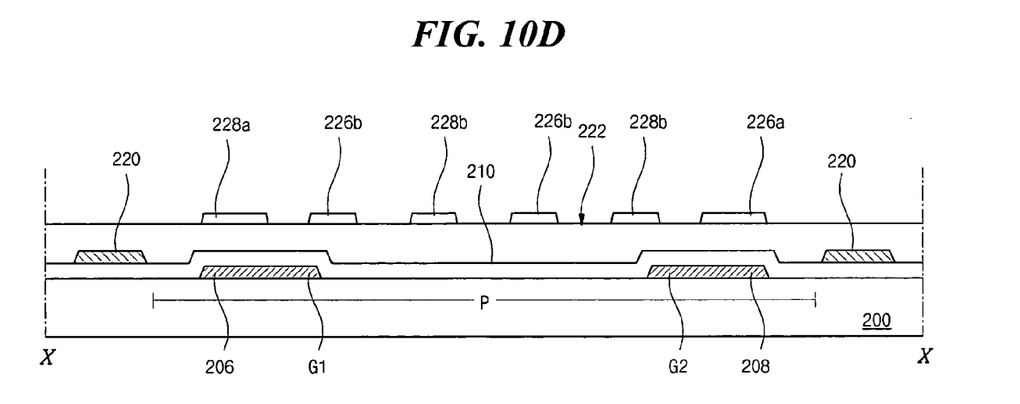

Next, as shown in FIGS. 9C and 10C, the passivation layer 222 is formed over the source and drain electrodes 216 and 218 and the data line 220 by depositing and patterning one of an inorganic insulating material and an organic insulating material. The inorganic insulating material includes at least one of silicon oxide (SiO2) and silicon nitride (SiNx), and the organic insulating material includes at least one of benzocyclobutane (BCB) and acrylic resin. While patterning the desired materials, the first to third contact holes CH1, CH2, and CH3 (of FIG. 7) are defined through the passivation layer 222. The first contact hole CH1 exposes the metal line 206, the second contact hole CH2 exposes the common line 208, and the third contact hole CH3 exposes the drain electrode 218.

Figure 9D:
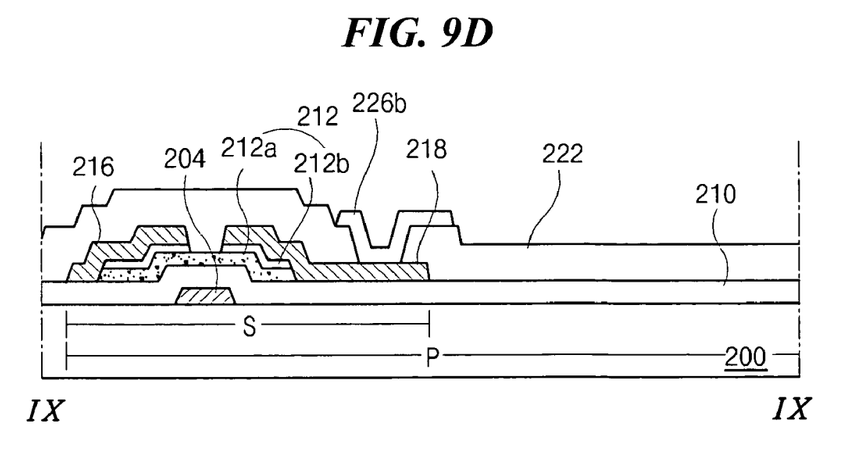

Next, as shown in FIGS. 9D and 10D, the pixel electrode 226 and the common electrode 228 are formed on the passivation layer 222 by depositing and patterning a transparent conductive material. The transparent conductive material includes one of indium-tin-oxide (ITO) and indium-zinc-oxide (IZO). At this point, the pixel electrode 226 is connected to the metal line 206 and the drain electrode 218 within the first and third contact holes CH1 and CH3, respectively. The common electrode 228 is connected to the common line 208 within the second contact hole CH2. The plurality of second pixel portions 226b partially overlap the plurality of first protruding portions G1, and the plurality of second common portions 228b partially overlap the plurality of second protruding portions G2. Accordingly, the exemplary array substrate for the IPS-LCD device according to the second exemplary embodiment of the present invention is manufactured by the processes shown in FIGS. 9A to 9D and FIGS. 10A to 10D.

It will be apparent to those skilled in the art that various modifications and variations can be made in the array substrate for IPS mode LCD device and method of fabricating the same of the present invention without departing from the spirit or scope of the invention. Thus, it is intended that the present invention cover the modifications and variations of this invention provided they come within the scope of the appended claims and their equivalents.

What is claimed is:

1. An array substrate for an In-Plane Switch (IPS) mode liquid crystal display (LCD) device, comprising:
    a gate line in a first direction on a substrate and a data line in a second direction over the substrate;
    a metal line in the second direction on the substrate and including a plurality of first protruding portions in the first direction;
    a common line in the second direction on the substrate and including a plurality of second protruding portions in the first direction;
    a thin film transistor (TFT) connected to the gate and data lines;
    an insulating layer over the metal line and the common line;
    a common electrode over the insulating layer and including a first common portion in the second direction and a plurality of second common portions in the first direction; and
    a pixel electrode over the insulating layer and including a first pixel portion in the second direction and a plurality of second pixel portions in the first direction, wherein the plurality of second common portions are alternately arranged with the plurality of second pixel portions.

2. The substrate according to claim 1, wherein the first common portion and the first pixel portion correspond to the metal line and the common line, respectively.

3. The substrate according to claim 1, wherein the metal line and the common line are formed of a same layer and a same material as the gate line.

4. The substrate according to claim 1, wherein the common and pixel electrodes are formed of a same layer.

5. The substrate according to claim 1, wherein the common and pixel electrodes are formed of one of indium-tin-oxide (ITO) and indium-zinc-oxide (IZO).

6. The substrate according to claim 1, wherein the common electrode is connected to the common line.

7. The substrate according to claim 1, wherein the pixel electrode is connected to the thin film transistor (TFT) and the metal line.

8. The substrate according to claim 1, wherein each of the plurality of second pixel portions partially overlaps each of the plurality of first protruding portions.

9. The substrate according to claim 1, wherein each of the plurality of second common portions partially overlaps each of the second protruding portions.

10. A method of fabricating an array substrate for an In-Plane Switch (IPS) mode liquid crystal display (LCD) device, comprising:
    forming a gate line, a gate electrode, a metal line, and a common line on a substrate, wherein the gate line is formed in a first direction, the gate electrode extends from the gate line in a second direction, and the metal and common lines are formed in the second direction, the second direction perpendicular to the first direction, the metal line separated from the common line, and the metal line includes a plurality of first protruding portions and the common line includes a plurality of second protruding portions;
    forming an gate insulating layer over the gate line, the gate electrode, the metal line and the common line;
    forming a semiconductor layer over the gate insulating layer at a portion corresponding to the gate electrode;
    forming source and drain electrodes and a data line over the semiconductor layer, wherein the data line is formed in the second direction, the source electrode extends from the data line, and the source electrode is separated from the drain electrode;
    forming a passivation layer over the source and drain electrodes and the data line, and first to third contact holes defined through the passivation layer, wherein the first contact hole exposes the metal line, the second contact holes expose the common line, and the third contact hole exposes the drain electrode; and
    forming a common electrode and a pixel electrode over the passivation layer, the common electrode includes a first common portion in the second direction and a plurality of second common portions extending from the first common portion, and the pixel electrode includes a first pixel portion in the second direction and a plurality of second pixel portions extending from the first pixel portion, wherein the plurality of second common portions are alternately arranged with the plurality of second pixel portions.

11. The method according to claim 10, wherein the first common portion corresponds to the metal line and the first pixel portion corresponds to the common line.

12. The method according to claim 10, wherein the common and pixel electrodes are formed of one of indium-tin-oxide (ITO) and indium-zinc-oxide (IZO).

13. The method according to claim 10, wherein the common electrode is connected to the common line within the second contact hole, and the pixel electrode is connected to the metal line and the drain electrode within the first and third contact holes, respectively.

14. The method according to claim 10, wherein each of the plurality of second pixel portions partially overlaps each of the plurality of first protruding portions, and each of the plurality of second common portions partially overlaps each of the plurality of second protruding portions.

15. An array substrate for an In-Plane Switch (IPS) mode liquid crystal display (LCD) device, comprising:
   a substrate;
   a gate line in a first direction on the substrate;
   a data line in a second direction over the substrate;
   a common line in the second direction on the substrate;
   a metal line in the second direction on the substrate and separated from the common line;
   a thin film transistor (TFT) connected to the gate and data lines;
   an insulating layer on the common line;
   a common electrode over the insulating layer and including a first common portion in the second direction and a plurality of second common portions in the first direction, and the plurality of second common portions extend from the first common portion; and
   a pixel electrode over the insulating layer and including a first pixel portion in the second direction and a plurality of second pixel portions in the first direction, and the plurality of second pixel portions extend from the first pixel portion, wherein the first pixel portion is separated from the first common portion, and the plurality of second pixel portions are alternately arranged with the plurality of second common portions,
   wherein the first common line portion overlaps the metal line.

16. The substrate according to claim 15, wherein the common and pixel electrodes are formed of a same layer.

17. The substrate according to claim 15, wherein the common and pixel electrodes are formed of one of indium-tin-oxide (ITO) and indium-zinc-oxide (IZO).

18. The substrate according to claim 15, wherein the first common portion is connected to the common line and the first pixel portion is connected to the thin film transistor (TFT).

* * * * *